US012113924B2

(12) United States Patent  
Jaiswal et al.

(10) Patent No.: US 12,113,924 B2  
(45) Date of Patent: Oct. 8, 2024

(54) ENHANCED CALLER IDENTIFICATION

(71) Applicant: INTERNATIONAL BUSINESS MACHINES CORPORATION, Armonk, NY (US)

(72) Inventors: Peeyush Jaiswal, Boca Raton, FL (US); Priyansh Jaiswal, Boca Raton, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/409,896

(22) Filed: Aug. 24, 2021

(65) Prior Publication Data

US 2023/0069102 A1   Mar. 2, 2023

(51) Int. Cl.
*H04M 1/57*   (2006.01)
*H04M 3/42*   (2006.01)
(Continued)

(52) U.S. Cl.
CPC ........... *H04M 1/573* (2013.01); *H04M 1/575* (2013.01); *H04M 3/42042* (2013.01);
(Continued)

(58) Field of Classification Search
None
See application file for complete search history.

(56) References Cited

U.S. PATENT DOCUMENTS 6,873,692 B1 *   3/2005   Silver ............... H04M 15/84
                                                  379/142.01
6,947,533 B2 *   9/2005   Okamura .......... H04M 1/2745
                                                  379/142.04
(Continued)

FOREIGN PATENT DOCUMENTS

CN   102075604 A   5/2011
EP   2562995 A9   2/2013
(Continued)

OTHER PUBLICATIONS

Schmitt, Alexander et al., "For Heaven's Sake, Gimme a Live Person!" Designing Emotion-Detection Customer Care Voice Applications in Automated Call Centers', Abstract Only, Advances in Speech Recognition: Mobile Environments, Call Centers and Clinics , pp. 191-219, Springer, published 2010 <retrieved from the Internet Jul. 13, 2021 at 12:34 PM.
(Continued)

*Primary Examiner* — Quoc D Tran
(74) *Attorney, Agent, or Firm* — Rakesh Roy

(57) ABSTRACT

A method, computer system, and a computer program product for enhanced caller identification (ID) is provided. The present invention may include, receiving, by a receiving party device, a call from a calling party device. The present invention may also include, retrieving, by the receiving party device, a previous interaction information corresponding to a previous interaction between a receiving party associated with the receiving party device and a calling party associated with the calling party device. The present inven-
(Continued)

tion may further include, in response to the received call from the calling party device, displaying, on the receiving party device, the retrieved previous interaction information corresponding to the previous interaction between the receiving party and the calling party.

14 Claims, 6 Drawing Sheets

(51) Int. Cl.
    *H04M 3/436*     (2006.01)
    *G10L 25/63*     (2013.01)

(52) U.S. Cl.
    CPC .............. *H04M 3/436* (2013.01); *G10L 25/63* (2013.01); *H04M 2203/551* (2013.01)

(56) References Cited

U.S. PATENT DOCUMENTS

| | | | |
|---|---|---|---|
| 7,248,677 B2 | 7/2007 | Randall et al. | |
| 8,204,192 B1* | 6/2012 | Suhail | H04M 1/2477 379/214.01 |
| 8,223,939 B2* | 7/2012 | Schaade | H04M 3/42042 379/207.15 |
| 10,079,939 B1* | 9/2018 | Bostick | H04M 3/42068 |
| 10,212,278 B1 | 2/2019 | Adinarayan et al. | |
| 10,657,166 B2 | 5/2020 | Gorzela et al. | |
| 10,672,402 B2 | 6/2020 | De et al. | |
| 11,057,516 B2* | 7/2021 | Sena, Jr. | H04W 4/20 |
| 2003/0148753 A1* | 8/2003 | Pappalardo | H04M 1/72403 455/415 |
| 2007/0248221 A1* | 10/2007 | Chatterjee | H04M 3/42314 379/211.02 |
| 2016/0100050 A1* | 4/2016 | VanBlon | H04W 4/16 455/415 |
| 2016/0164813 A1* | 6/2016 | Anderson | H04L 51/216 709/206 |
| 2016/0198047 A1* | 7/2016 | McCormack | G06Q 30/016 379/265.09 |
| 2017/0262891 A1* | 9/2017 | Green | G06Q 30/0267 |
| 2017/0279965 A1* | 9/2017 | Weldon | H04W 4/16 |
| 2018/0122368 A1 | 5/2018 | Costello et al. | |
| 2019/0156838 A1* | 5/2019 | Kannan | G10L 15/26 |
| 2020/0076762 A1* | 3/2020 | Kwatra | H04L 51/234 |
| 2021/0314440 A1* | 10/2021 | Matias | H04M 3/42136 |
| 2021/0385325 A1* | 12/2021 | Tian | G06F 3/14 |

FOREIGN PATENT DOCUMENTS

| | | | | |
|---|---|---|---|---|
| EP | 3413550 A1 * | 12/2018 | | H04M 3/42042 |
| KR | 20060047148 A | 5/2006 | | |

OTHER PUBLICATIONS

Mell et al., "The NIST Definition of Cloud Computing", Recommendations of the National Institute of Standards and Technology, NIST Special Publication 800-145, Sep. 2011, 7 pages.

* cited by examiner

ENHANCED CALLER IDENTIFICATION

BACKGROUND

The present invention relates generally to the field of computing, and more particularly to communication technology.

When a caller initiates a call, the receiver may typically see a telephone number associated with the caller. If the caller is stored in receiver's contact list, the receiver may also see the name of the caller when the call is received. In these instances, the receiver may need to make a static decision regarding whether to answer the call based the receiver's memory of the caller and/or time availability. More data points may enable the receiver to make an informed decision about how to handle an incoming call.

SUMMARY

Embodiments of the present invention disclose a method, computer system, and a computer program product for enhanced caller identification (ID). The present invention may include, receiving, by a receiving party device, a call from a calling party device. The present invention may also include, retrieving, by the receiving party device, a previous interaction information corresponding to a previous interaction between a receiving party associated with the receiving party device and a calling party associated with the calling party device. The present invention may further include, in response to the received call from the calling party device, displaying, on the receiving party device, the retrieved previous interaction information corresponding to the previous interaction between the receiving party and the calling party.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
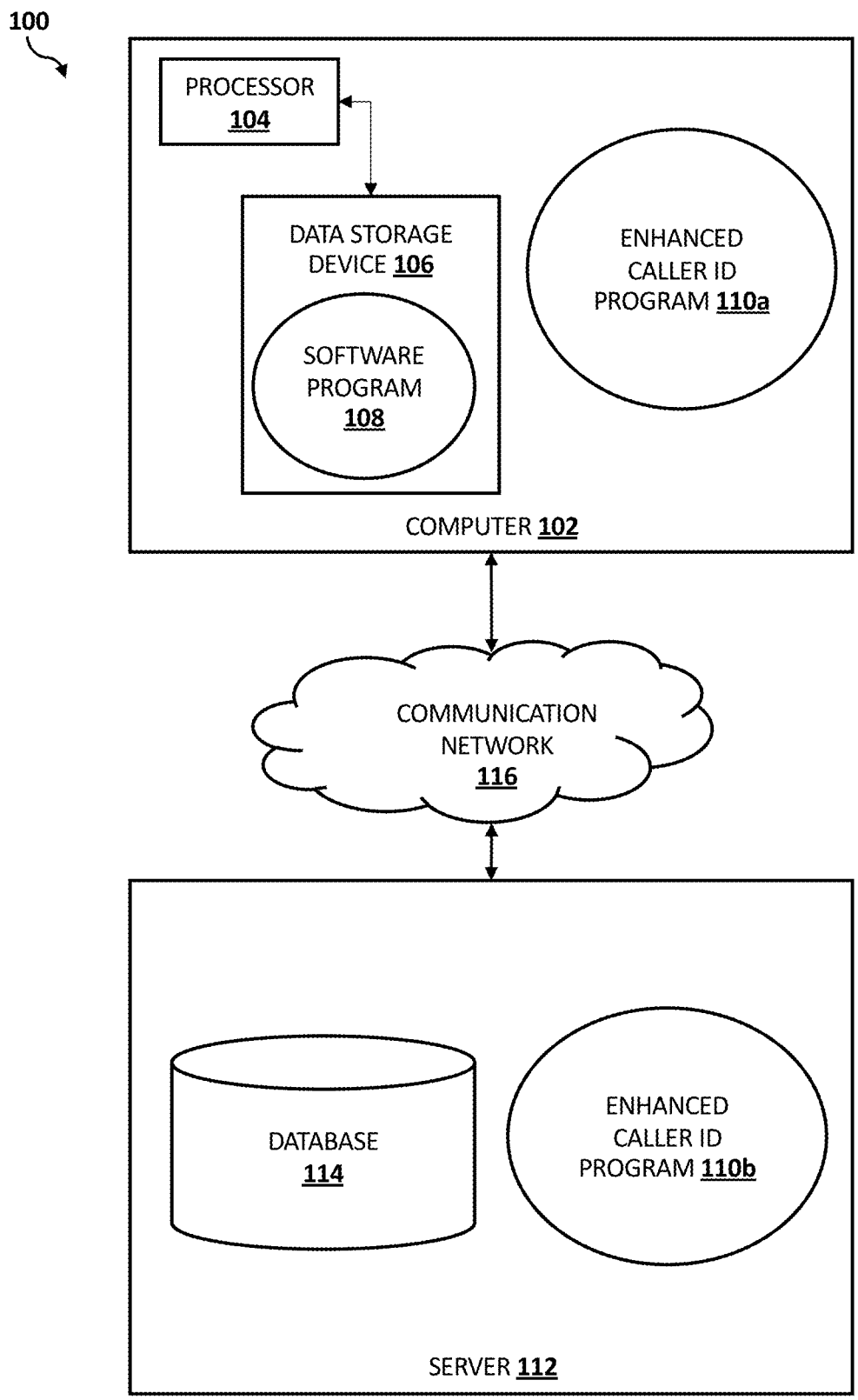
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for enhanced caller identification. As such, the present embodiment has the capacity to improve the field of communication technology by dynamically providing an enhanced caller identification (ID) display including contextual information from a previous call from the same caller. More specifically, an enhanced caller ID program may receive, by a receiving party, a call from a calling party. Then, the enhanced caller ID program may analyze the received call between the calling party and the receiving party. Next, the enhanced caller ID program may determine a receiving party sentiment based on the analyzed call. Then, the enhanced caller ID program may select at least one picture character that represents the determined receiving party sentiment of the analyzed call. Next, the enhanced caller ID program may store the selected at least one picture character as part of a previous call information for the receiving party. Then, the enhanced caller ID program may collect at least one call statistic from the analyzed called. Next, the enhanced caller ID program may store the collected at least one call statistic as part of the previous call information for the receiving party. Thereafter, the enhanced caller ID program may, in response to receiving the subsequent call from the calling party, display the previous call information to the receiving party.

As described previously, when a caller initiates a call, the receiver may typically see a telephone number associated with the caller. If the caller is stored in receiver's contact list, the receiver may also see the name of the caller when the call is received. In these instances, the receiver may need to make a static decision regarding whether to answer the call based the receiver's memory of the caller and/or time availability. More data points may enable the receiver to make an informed decision about how to handle an incoming call.

Therefore, it may be advantageous to, among other things, provide a way to display data from a previous interaction as contextual information for the receiver (receiving party) in association with a subsequent call from the caller (calling party).

According to at least one embodiment, the additional data points from the previous call may include the receiver's perception or sentiment of the previous call from the caller, the length of the previous call, the content of the previous call (e.g., reason for calling; conversation topic), and the number of calls received from the caller. In at least one embodiment, these data points from the previous call may be displayed on the receiver's device in response to receiving a subsequent call from the same caller. In one embodiment, the enhanced caller ID program may enable a user (e.g., receiving party; receiver) to configure the attributes (e.g., previous call information) that the user wants to be displayed on a user device (e.g., receiver device) when a call is received from the caller.

According to one embodiment, the enhanced caller ID program may link the previous call information to a specific caller and store the previous call information in the user's contact list in association with that specific caller. In one embodiment, the enhanced caller ID program may attach one or more picture characters to the contact information of the specific caller in the user's contact list. In one embodiment, the picture characters may represent the user's (receiving party) sentiment or perception of the conversation that took place during a previous call from the specific caller. In some embodiments, the enhanced caller ID program may also attach one or more picture characters to represent the caller's sentiment or perception of the conversation that took place during a previous call. In one embodiment, the enhanced caller ID program may update the picture characters after each call to provide context for a subsequent call between the user and the specific caller.

According to at least one embodiment, the enhanced caller ID program may collect one or more call statistics. In one embodiment, the call statistics may be stored with the previous call information in the user's contact list and may be linked to the specific caller. In one embodiment, the call statistics may be displayed on the user device responsive to the user receiving a subsequent call from the specific user.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a enhanced caller ID program 110a. The networked computer environment 100 may also include a server 112 that is enabled to run a enhanced caller ID program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the enhanced caller ID program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the enhanced caller ID program 110a, 110b (respectively) to receive, in response to a subsequent call from a number, one or more contextual information about a previous call from the number associated with the subsequent call. The disclosed embodiments are explained in more detail below with reference to FIGS. 2 and 3.

Figure 2:
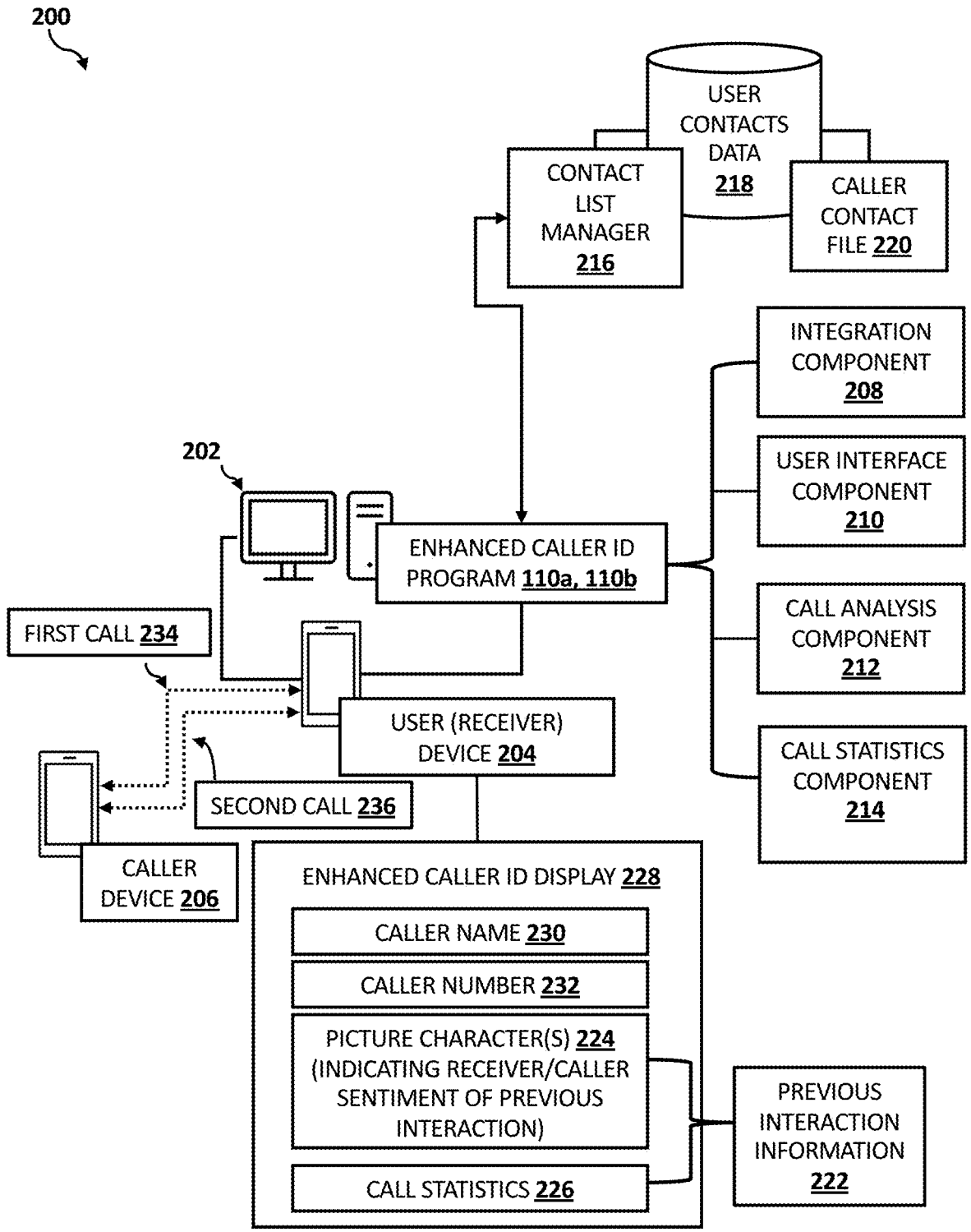
FIG. 2 is schematic block diagram of a digital conversation environment according to at least one embodiment.

Referring now to FIG. 2, a schematic block diagram of a digital communication environment 200 implementing the enhanced caller ID program 110a, 110b according to at least one embodiment is depicted. According to one embodiment, the digital communication environment 200 may include one or more components (e.g., client computer 102; server computer 112; communication network 116) of the computer environment 100 discussed above with reference to FIG. 1.

According to one embodiment, the digital communication environment 200 may include a computer system 202 having a tangible storage device and a processor that is enabled to run the enhanced caller ID program 110a, 110b. In one embodiment, the computer system 202 may include one or more client computers 102 and/or one or more server computers 112. In various embodiments, the client computer 102 and/or the server computer 112 of the computer system 202 may include a workstation, a personal computing device, a laptop computer, a desktop computer, a thin-client terminal, a tablet computer, a smartphone, a smart watch or other smart wearable, or other electronic devices.

More specifically, in at least one embodiment, the computer system 202 may include a user device 204 (e.g., smartphone or any other client computer 102) having a tangible storage device and a processor that is enabled to run the enhanced caller ID program 110a, 110b, as will be detailed further below. In one embodiment, the user device 204 may be associated with a user receiving a call (e.g., telephone call, audio call, video call) from a caller device 206 (e.g., smartphone or any other client computer 102). As such, in various embodiments, the user may also be referred to as a receiver, a receiving party, and a called party and the user device 204 may also be referred to as a first device, a receiver device, a receiving party device, and a called party device. In various embodiments, the caller device 206 may be associated with a caller initiating a call from the caller device 206 to the user device 204. In at least one embodiment, the caller may also be referred to as a calling party and the caller device 206 may also be referred to as a second device and a calling party device.

According to at least one embodiment, the enhanced caller ID program 110a, 110b may include a single computer program or multiple program components/modules or sets of instructions being executed by the processor of the computer system 202. The enhanced caller ID program 110a, 110b may include routines, objects, components, units, logic, data structures, and actions that may perform particular tasks or implement particular abstract data types. The enhanced caller ID program 110a, 110b may be practiced in distributed cloud computing environments where tasks may be performed by remote processing devices which may be linked through the communication network 116. In one embodiment, the enhanced caller ID program 110a, 110b may include program instructions that may be collectively stored on one or more computer-readable storage media. As shown in the illustrated embodiment of FIG. 2, the enhanced caller ID program 110a, 110b may include an integration component 208, a user interface (UI) component 210, a call analysis component 212, and a call statistics component 214.

According to at least one embodiment, the enhanced caller ID program 110a, 110b may implement the integration component 208 to interact with a contact list manager 216 that enables users to access (e.g., store and retrieve) user contacts data 218. In one embodiment, the user contacts data 218 may include one or more contact lists associated with the user. Each of the contact lists may include one or more caller contact files 220 associated with corresponding contacts. In one embodiment, the caller contact files 220 may include a digital file format, such as, for example, a Virtual Card Format (VCF) or vCard for storing contact information. In one embodiment, the user may interact with the contact list manager 216 to create the caller contact file 220 (e.g., contact list entry) for the caller associated with the caller device 206. In one embodiment, the user may enter contact information in the caller contact file 220, such as, for example, the name and telephone number associated with the caller/caller device 206. In various embodiments, the user may create the caller contact file 220 manually. In other embodiments, the contact list manager 216 may automatically create the caller contact file 220 (e.g., the contact file 220 is received from another device).

According to one embodiment, the integration component 208 may interact with the contact list manager 216 and/or direct the contact list manager 216 to store one or more previous interaction information 222 associated with a contact (e.g., caller) in the corresponding caller contact file 220. In another embodiment, the integration component 208 may enable the user to manually input one or more previous interaction information 222 in the caller contact file 220. In one embodiment, a previous interaction may include a previous conversation over a call. In another embodiment, the previous interaction may include a previous face-to-face conversation. For example, after a face-to-face conversation a person, the user may manually enter one or more previous interaction information 222 in the caller contact file 220 associated with the person (e.g., contact). If the user is meeting the person for the first time, the user may create a new caller contact file 220 for the person and enter information, such as, for example, the name and telephone number associated with the person. Then, the user may also manually enter previous interaction information 222 into the caller contact file 220 based on the face-to-face interaction, as will be further detailed below.

In one embodiment, the previous interaction information 222 may include one or more picture characters 224 and one or more call statistics 226, which may be presented to the user via an enhanced caller ID display 228. In one embodiment, the picture characters 224 may be implemented by the call analysis component 212 to indicate (to the user responsive to a subsequent call) the user's (e.g., receiver) sentiment of the previous interaction (e.g., previous face-to-face interaction or previous call), as will be further detailed below. In at least one embodiment, the picture characters 224 may also be implemented by the call analysis component 212 to indicate (to the user responsive to a subsequent call) the caller's sentiment of the previous interaction. In various embodiments, the picture characters 224 may include emojis (e.g., pictograms, logograms, ideograms, smileys), emoticons, or any other graphic symbols. In one embodiment, the call statistics 226 may include data, such as, for example, the number of times a caller has called and the duration of the previous call and/or the average duration of previous calls.

According to one embodiment, the enhanced caller ID program 110a, 110b may implement the UI component 210 to enable the user to configure the attributes (e.g., previous interaction information 222) the user may want to be displayed on the enhanced caller ID display 228 of the user device 204 responsive to receiving a call, in addition to a caller name 230 and a caller number 232. In one embodiment, the user may interact with the UI component 210 to indicate that the user may want picture characters 224 displayed on the enhanced caller ID display 228. In one embodiment, the user may indicate that picture characters 224 representing the user's (e.g., receiver) sentiment of the previous interaction may be displayed responsive to receiving a call from a caller. In one embodiment, the user may indicate that picture characters 224 representing the caller's sentiment of the previous interaction may also be displayed responsive to receiving a call from a caller. In at least one embodiment, the user may also interact with the UI component 210 to configure the call statistics 226 that may be displayed responsive to receiving a call from a caller. In various embodiments, the UI component 210 may enable the user to configure the placement of the previous interaction information 222 on the enhanced caller ID display 228.

According to one embodiment, the user (e.g., receiver) via the user device 204 may receive a first call 234 and a second call 236 from the caller via the caller device 206. In one embodiment, the first call 234 may refer to an initial call or a previous call, relative to the second call 236, in a pair of calls. In one embodiment, the second call 236 may refer to a subsequent call relative to the first call 234, in the pair of calls. According to one embodiment, the enhanced caller ID program 110a, 110b may implement the call analysis component 212 to determine and store (e.g., in the corresponding caller contact file 220 as previous interaction information 222) the sentiments of the parties after the first call 234 in order to provide that information (e.g., graphically via one or more emojis) to the user (e.g., receiver) in response to receiving the second call 236 (e.g., subsequent call) from the same caller. According to one embodiment, the enhanced caller ID program 110a, 110b may update and store the sentiments (e.g., graphically represented) after each call in order to provide that information (e.g., graphically via one or more emojis) to the user (e.g., receiver) in response to receiving the subsequent call. In at least one embodiment, the enhanced caller ID program 110a, 110b may enable the user, after a face-to-face interaction with a contact, to manually enter the user's sentiments (e.g., graphically represented via one or more emojis) associated with the face-to-face interaction in the corresponding caller contact file 220 as previous interaction information 222. Thereafter, the enhanced caller ID program 110a, 110b may provide that information (e.g., graphically via one or more emojis) to the user (e.g., receiver) in response to receiving a call from the same contact.

In various embodiments, the call analysis component 212 may leverage natural language processing (NLP), text analysis, and voice biometrics to identify, extract, and quantify post-call sentiments of the parties (e.g., calling party, receiving party) in the call.

According to one embodiment, the enhanced caller ID program 110a, 110b may record the audio data from the call (e.g., after receiving permission from the user) and implement the call analysis component 212 to analyze the recorded audio data. In such embodiments, the enhanced caller ID program 110a, 110b may temporarily store the recorded audio data in a storage device (e.g., data storage device 106; database 114) for analysis using the call analysis component 212. In one embodiment, the recorded audio data may be temporarily stored in the storage device, processed by the call analysis component 212, and overwritten by new recorded audio data (e.g., another call). In one embodiment, the temporary storage in the storage device may include a buffer, cache, or any other suitable temporary storage mechanism. In one embodiment, the audio processing of the recorded audio data may take place locally using the user device 204. In another embodiment, the user device 204 may transmit (e.g., via communication network 116) the recorded audio data to a remote processing server of the computer system 202 for the audio processing of the recorded audio data. According to at least one embodiment, the enhanced caller ID program 110a, 110b may process the audio data stream concurrently with the conversation (e.g., without needing to record the call) over the duration of the call.

According to one embodiment, the enhanced caller ID program 110a, 110b may convert the audio data of the receiver (e.g., user) into text and process the text to establish the receiver's sentiment (e.g., opinion or perception) as relating to a particular call with a caller. In one embodiment, the call analysis component 212 may utilize sentiment analysis and topic modeling techniques to characterize an orientation of the sentiment expressed in the user's (e.g., receiver) conversation with the caller. In embodiments, the sentiment orientation may include, the polarity, tone, and/or emotions expressed in the user's (e.g., receiver) conversation with the caller. In various embodiments, the sentiment orientation may be clustered into three main categories: positive, negative, and neutral sentiment. In at least one embodiment, the sentiment orientation indicate more nuanced emotional states, such as, for example, enjoyment, anger, sadness, and surprise. Using topic modeling, the call analysis component 212 may draw out and identify the topics or context of the conversation between the user (e.g., receiver) and the caller. In various embodiments, the call analysis component 212 may apply a statistical accumulation of multiple sentiments expressed by the user during the conversation to determine an aggregated sentiment of the entire conversation.

According to one embodiment, the call analysis component 212 may then map the user sentiment of the call to one or more picture characters 224 (e.g., emojis) which may graphically represent the user sentiment when presented via the enhanced caller ID display 228. In one embodiment, the call analysis component 212 may select one or more picture characters to illustrate the polarity, tone, and/or emotions expressed in the user's (e.g., receiver) conversation with the caller. In another embodiment, the call analysis component 212 may also select one or more picture characters to illustrate the topics or context of the conversation between the user and the caller. According to one embodiment, the call analysis component 212 may also utilize sentiment analysis and topic modeling techniques on the audio data associated with the caller in order to map the caller sentiment of the call to one or more picture characters 224. In one embodiment, if the user configures the enhanced caller ID display 228 to present both the user and the caller's previous interaction sentiments, the enhanced caller ID display 228 may indicate which picture characters 224 represents the user's sentiments and which picture characters 224 represents the caller's sentiments.

According to one embodiment, the enhanced caller ID program 110a, 110b may implement the call statistics component 214 to gather call statistics data regarding previous calls (e.g., first call 234) to be presented in the enhanced caller ID display 228 as call statistics 226 in response to receiving the subsequent call (e.g., second call 236) from the same caller. In one embodiment, the call statistics 226 may include data, such as, for example, the number of times a caller has called and the duration of the previous call and/or the average duration of previous calls. In one embodiment, the call statistics component 214 may store the call statistics data in the caller contact file 220 corresponding to the caller associated with the call statistics data. In one embodiment, the call statistics component 214 may store the call statistics data as metadata in the caller contact file 220. In at least one embodiment, the call statistics data may be stored on another storage device (e.g., data storage device 106; database 114) and the call statistics component 214 may implement pointers from the caller contact file 220 to the storage device storing the call statistics data. In one embodiment, the call statistics component 214 may update the call statistics data after each call to incorporate the statistics from that call (e.g., duration of the call) to present that data to the user in response to a subsequent call.

As described previously, according to one embodiment, the user device 204 may receive a second call 236 (e.g., subsequent call) from the caller device 206. Based on a telephone number associated with the second call 236, the enhanced caller ID program 110a, 110b may retrieve (e.g., from the corresponding caller contact file 220) the previous interaction information 222 associated with the first call 234 (e.g., previous call) from the same number. Then, the enhanced caller ID program 110a, 110b may display the previous interaction information 222 (e.g., emojis representing receiver sentiment) about the first call 234 in the enhanced caller ID display 228 rendered on the user device 204. The enhanced caller ID program 110a, 110b may enable the user (e.g., receiver) to use this additional information to decide whether to answer the call, send the call to voicemail, respond with a text message, or block the caller.

Figure 3:
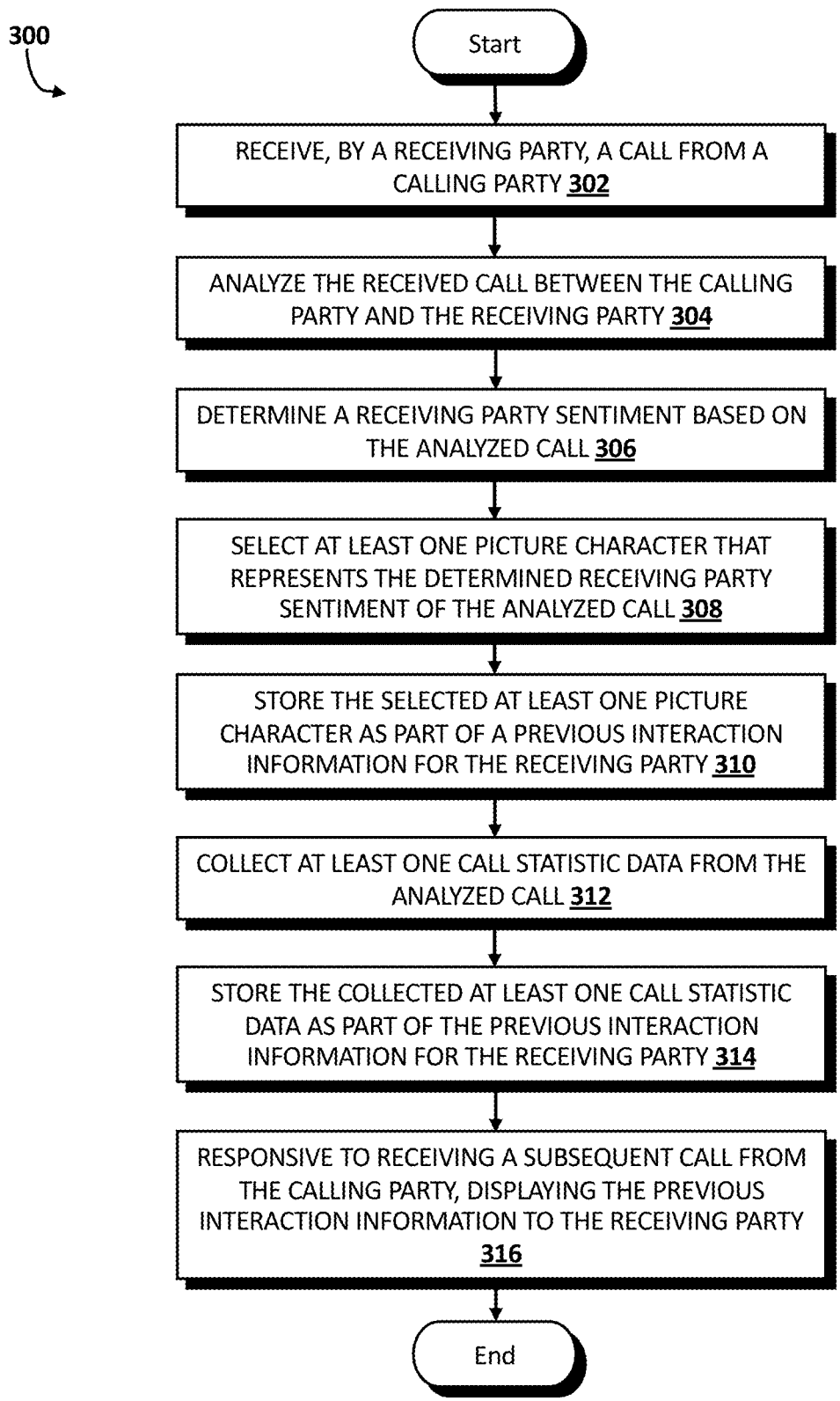
FIG. 3 is an operational flowchart illustrating an enhanced caller ID process according to at least one embodiment.

Referring now to FIG. 3, an operational flowchart illustrating the exemplary enhanced caller ID process 300 used by the enhanced caller ID program 110a and 110b according to at least one embodiment is depicted.

At 302, a call is received by a receiving party from a calling party. According to one embodiment, a user (e.g., receiving party) via a user device (e.g., receiving party smartphone) may receive one or more calls (e.g., a first call 234 and a second call 236) from the calling party via a caller device (e.g., calling party smartphone).

Then at 304, the received call between the calling party and the receiving party is analyzed. According to one embodiment, the enhanced caller ID program 110a, 110b may leverage NLP, text analysis, and voice biometrics to identify, extract, and quantify post-call sentiments of the parties (e.g., calling party, receiving party) in the call.

Then at 306, a receiving party sentiment of the analyzed call is determined. According to one embodiment, the enhanced caller ID program 110a, 110b may convert the audio data of the receiving party into text and process the text to establish the receiving party sentiment (e.g., opinion or perception) as relating to a particular call with the calling party. In one embodiment, the enhanced caller ID program 110a, 110b may utilize sentiment analysis and topic modeling techniques to characterize an orientation of the sentiment expressed in the receiving party's conversation with the calling party, as described previously with reference to FIG. 2. In some embodiments, the enhanced caller ID program 110a, 110b may implement topic modeling to identify the topics or context of the conversation between the receiving party and the calling party. In various embodiments, the enhanced caller ID program 110a, 110b may apply a statistical accumulation of multiple sentiments expressed by the receiving party during the conversation to determine an aggregated sentiment of the entire conversation.

Then at 308, at least one picture character is selected that represents the determined receiving party sentiment of the analyzed call. According to one embodiment, the enhanced caller ID program 110a, 110b may then map the receiving party sentiment to one or more picture characters (e.g., emojis) which may graphically represent the receiving party sentiment of the call, as described previously with reference to FIG. 2. In various embodiments, the picture characters may include emojis (e.g., pictograms, logograms, ideograms, smileys), emoticons, or any other graphic symbols. In one embodiment, the picture characters may be implemented by the enhanced caller ID program 110a, 110b to indicate (to the receiving party responsive to a subsequent call from the calling party) the receiving party sentiment of the previous interaction (e.g., previous face-to-face interaction or previous call), as described previously with reference to FIG. 2.

Then at 310, the selected at least one picture character is stored as part of a previous interaction information for the receiving party. According to one embodiment, the enhanced caller ID program 110a, 110b may interact with a contact list manager and/or direct the contact list manager to store one or more previous interaction information associated with a contact (e.g., calling party) in a corresponding caller contact file. In one embodiment, the previous interaction information may include one or more picture characters, as described previously with reference to FIG. 2.

Then at 312, at least one call statistic data is collected from the analyzed call. According to one embodiment, the enhanced caller ID program 110a, 110b may gather call statistics data regarding previous calls (e.g., first call 234) to be presented in an enhanced caller ID display (e.g., rendered on receiving party smartphone) as call statistics in response to receiving the subsequent call (e.g., second call 236) from the same calling party. In one embodiment, the call statistics may include data, such as, for example, the number of times the calling party has previously called and the duration of the previous call and/or the average duration of previous calls.

Then at 314, the collected at least one call statistic data is stored as part of the previous interaction information for the receiving party. According to one embodiment, the enhanced caller ID program 110a, 110b may store the call statistics data in the caller contact file corresponding to the calling party associated with the call statistics data. In one embodiment, the enhanced caller ID program 110a, 110b may store the call statistics data as metadata in the caller contact file. In at least one embodiment, the call statistics data may be stored on another storage device (e.g., data storage device 106; database 114) and the enhanced caller ID program 110a, 110b may implement pointers from the caller contact file to the storage device storing the call statistics data. In one embodiment, the enhanced caller ID program 110a, 110b may update the call statistics data after each call to incorporate the statistics from that call (e.g., duration of the call) and to present that data to the receiving party in response to a subsequent call.

Thereafter at 316, response to receiving a subsequent call from the calling party, the previous interaction information is displayed to the receiving party. According to one embodiment, the enhanced caller ID program 110a, 110b may retrieve (e.g., from the corresponding caller contact file 220) the previous interaction information associated with the previous call (e.g., first call 234) based on the telephone number associated with the subsequent call (e.g., second call 236). Then, the enhanced caller ID program 110a, 110b may display the previous interaction information (e.g., emojis illustrating receiving party sentiment and call statistics data) about the first call 234 in the enhanced caller ID display rendered on the user device (e.g., receiving party smartphone).

As described with reference to FIG. 2 (digital communication environment 200) and FIG. 3 (enhanced caller ID process 300) above, according to one embodiment, the enhanced caller ID program 110a, 110b may receive, by a receiving party device, a call from a calling party device. Then, the enhanced caller ID program 110a, 110b may retrieve, by the receiving party device, a previous interaction information corresponding to a previous interaction between a receiving party associated with the receiving party device and a calling party associated with the calling party device. Thereafter, responsive to the received call from the calling party device, the enhanced caller ID program 110a, 110b may display, on the receiving party device, the retrieved previous interaction information corresponding to the previous interaction between the receiving party and the calling party.

According to one embodiment, the enhanced caller ID program 110a, 110b may retrieve, based on a telephone number associated with the received call from the calling party device, the previous interaction information about the previous interaction with the calling party, wherein the previous interaction may include a previous call from the telephone number of the calling party.

According to one embodiment, the previous interaction between the receiving party associated with the receiving party device and the calling party associated with the calling party device may include a previous face-to-face conversation between the calling party and the receiving party. In another embodiment, the previous interaction may include a previous call between the calling party and the receiving party.

According to one embodiment, the enhanced caller ID program 110a, 110b may store the previous interaction information in a caller contact file corresponding to the calling party. In one embodiment, the caller contact file may include an entry in a contact list associated with the receiving party device.

According to one embodiment, the enhanced caller ID program 110a, 110b may display, on the receiving party device, at least one picture character that graphically represents a receiving party sentiment of the previous interaction (e.g., previous call or previous face-to-face conversation) between the receiving party and the calling party.

According to one embodiment, the enhanced caller ID program 110a, 110b may display, on the receiving party device, at least one call statistic collected from the previous interaction between the receiving party and the calling party.

According to one embodiment, the enhanced caller ID program 110a, 110b may analyze the previous call between the calling party and the receiving party. Then, the enhanced caller ID program 110a, 110b may determine, based on the analyzed previous call, a receiving party sentiment of the analyzed previous call. Thereafter, the enhanced caller ID program 110a, 110b may select at least one picture character that represents the determined receiving party sentiment of the analyzed previous call.

According to one embodiment, the enhanced caller ID program 110a, 110b may store, as part of the previous interaction information corresponding to the analyzed previous call between the calling party and the receiving party, the selected at least one picture character representing the determined receiving party sentiment of the analyzed previous call.

According to one embodiment, the enhanced caller ID program 110a, 110b may, in response to the received call from the calling party device, display, on the receiving party device, the stored at least one picture character representing the determined receiving party sentiment of the analyzed previous call.

For at least the reasons detailed above, the functionality of a computer may be improved by the enhanced caller ID program 110a, 110b. More specifically, the functionality of a computer may be improved because the enhanced caller ID program 110a, 110b may enable the computer to display data from a previous interaction as contextual information for the receiver (receiving party) in association with a subsequent call from the caller (calling party).

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
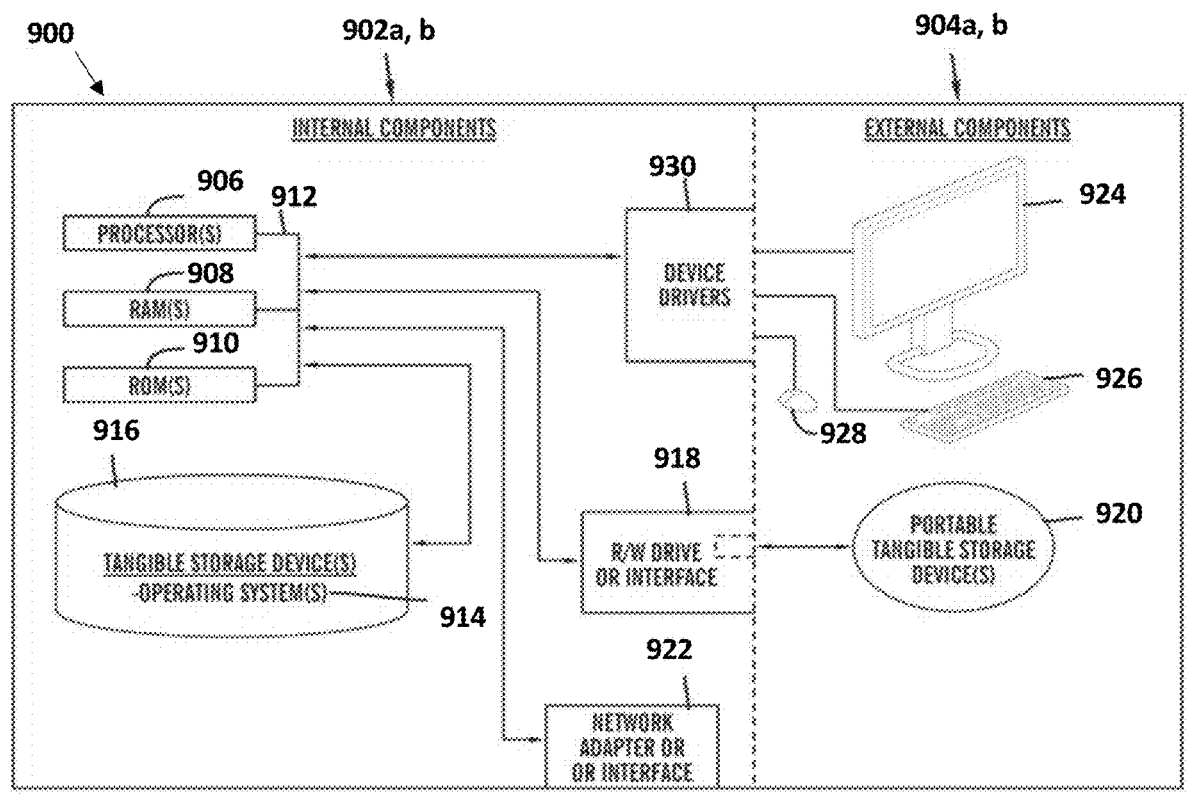
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 4. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the enhanced caller ID program 110a in client computer 102, and the enhanced caller ID program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the enhanced caller ID program 110a and 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the enhanced caller ID program 110a in client computer 102 and the enhanced caller ID program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the enhanced caller ID program 110a in client computer 102 and the enhanced caller ID program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
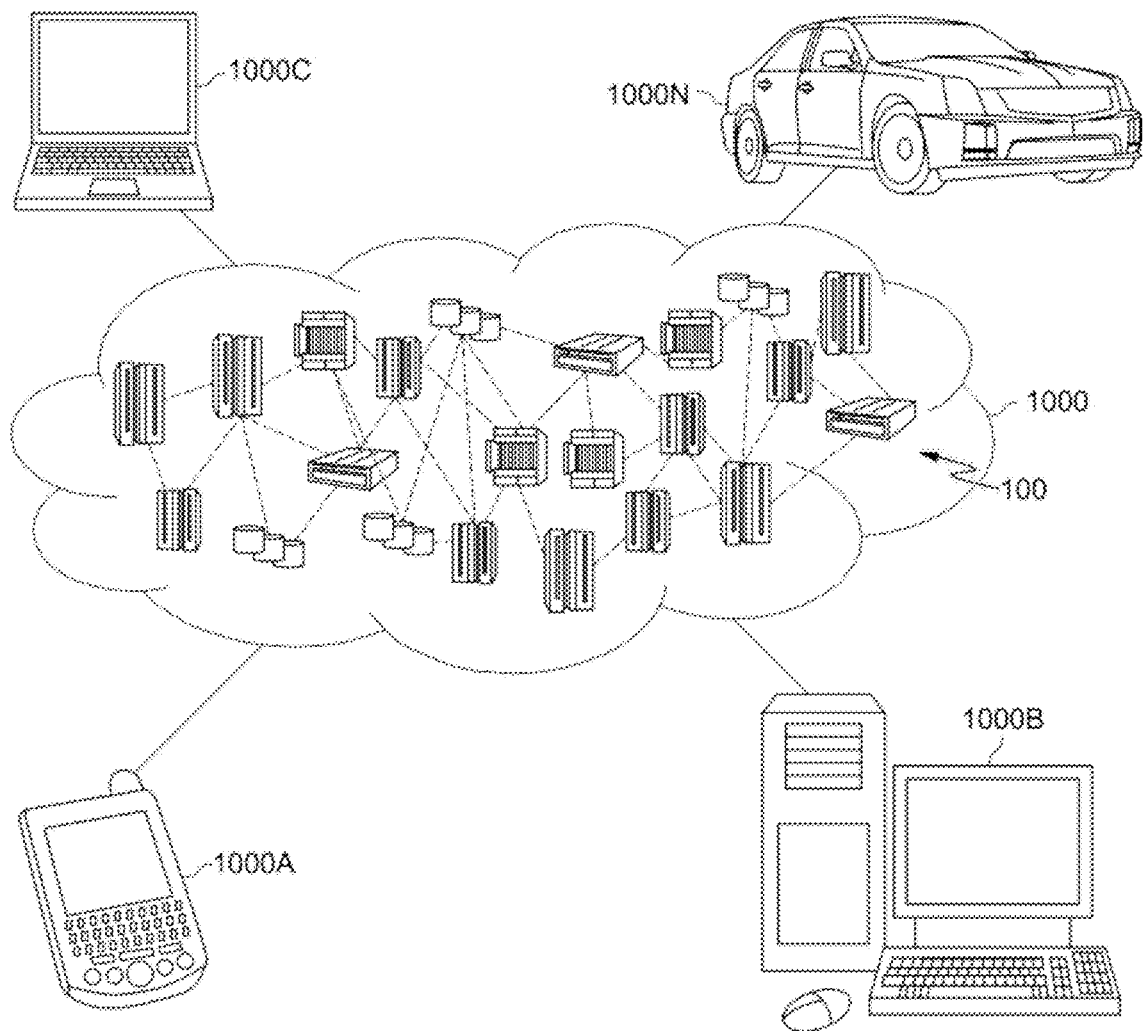
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
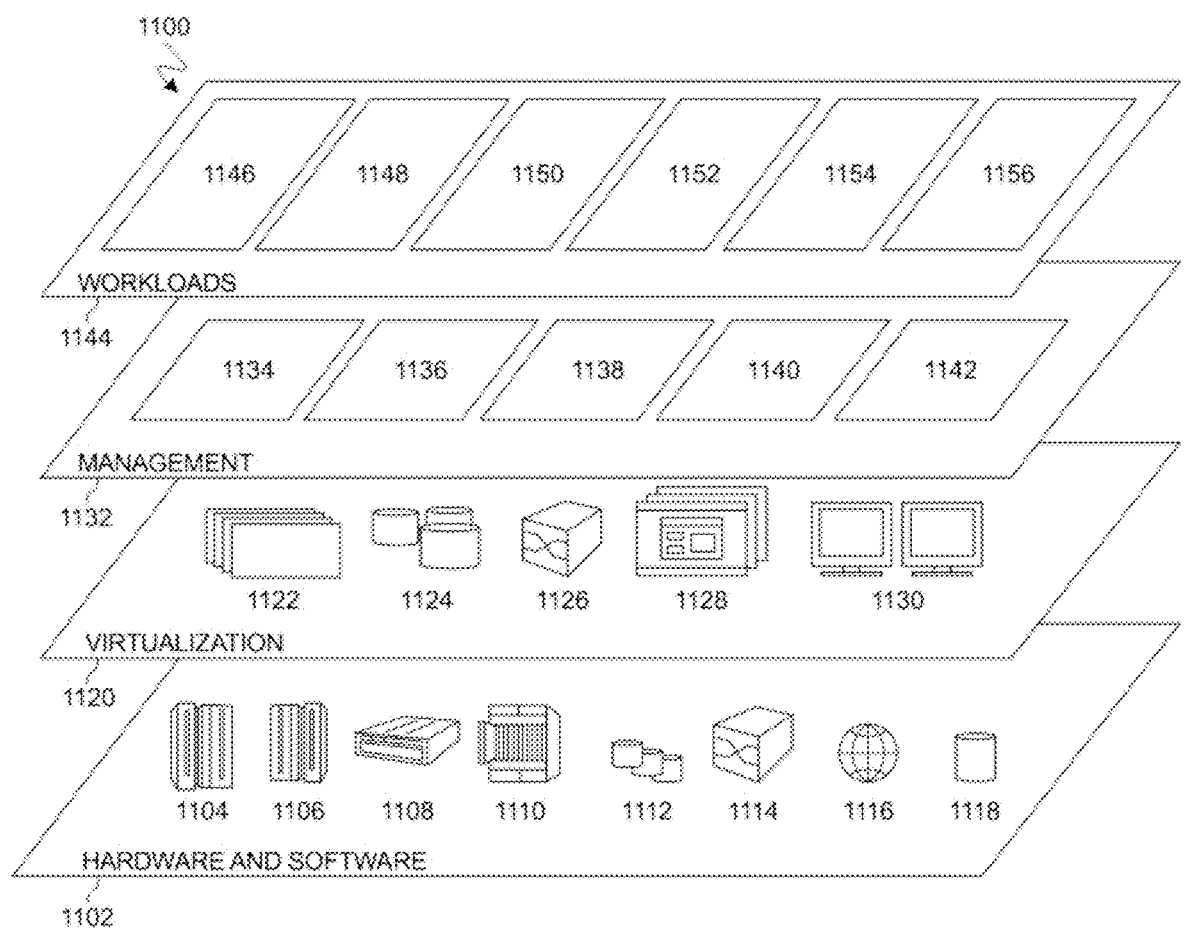
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized.

Examples of workloads and functions which may be provided from this layer include: mapping and navigation 1146; software development and lifecycle management 1148; virtual classroom education delivery 1150; data analytics processing 1152; transaction processing 1154; and enhanced caller ID processing 1156. A enhanced caller ID program 110a, 110b provides a way to display, on a receiving party device, at least one picture character graphically representing a receiving party sentiment of a previous interaction between the receiving party and a calling party.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    receiving, by a receiving party device, a call from a calling party device, wherein the calling party device is associated with a calling party that is previously known to a receiving party associated with the receiving party device, and wherein a name of the calling party is previously stored in a corresponding caller contact file in a contact list associated with the receiving party device;
    in response to the received call from the calling party that is previously known, retrieving, by the receiving party device, at least one picture character stored with the name of the calling party in the corresponding caller contact file, the at least one picture character graphically representing a receiving party sentiment corresponding to a previous interaction between the receiving party and the calling party; and
    displaying, on the receiving party device, the name of the calling party and the at least one picture character graphically representing the receiving party sentiment of the previous interaction between the receiving party and the calling party.

2. The computer-implemented method of claim 1, wherein retrieving the at least one picture character graphically representing the receiving party sentiment corresponding to the previous interaction between the receiving party associated with the receiving party device and the calling party associated with the calling party device further comprises:
    based on a telephone number associated with the received call from the calling party device, retrieving the at least one picture character graphically representing the receiving party sentiment about the previous interaction with the calling party, wherein the previous interaction includes a previous call from the telephone number of the calling party.

3. The computer-implemented method of claim 1, wherein the previous interaction between the receiving party associated with the receiving party device and the calling party associated with the calling party device further comprises: a previous face-to-face conversation between the calling party and the receiving party.

4. The computer-implemented method of claim 1, wherein the previous interaction between the receiving party associated with the receiving party device and the calling party associated with the calling party device further comprises: a previous call between the calling party and the receiving party.

5. The computer-implemented method of claim 1, further comprising:
    displaying, on the receiving party device, at least one call statistic collected from the previous interaction between the receiving party and the calling party.

6. The computer-implemented method of claim 4, further comprising:
    analyzing the previous call between the calling party and the receiving party;
    determining, based on the analyzed previous call, a receiving party sentiment of the analyzed previous call; and
    selecting the at least one picture character that represents the determined receiving party sentiment of the analyzed previous call.

7. The computer-implemented method of claim 6, further comprising:
    storing, as part of a previous interaction information corresponding to the analyzed previous call between the calling party and the receiving party, the selected at least one picture character representing the determined receiving party sentiment of the analyzed previous call.

8. The computer-implemented method of claim 7, further comprising:
    in response to the received call from the calling party device, displaying, on the receiving party device, the stored at least one picture character representing the determined receiving party sentiment of the analyzed previous call.

9. A computer system for enhanced caller identification (ID), comprising:
    one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
    receiving, by a receiving party device, a call from a calling party device, wherein the calling party device is associated with a calling party that is previously known to a receiving party associated with the receiving party device, and wherein a name of the calling party is previously stored in a corresponding caller contact file in a contact list associated with the receiving party device;
    in response to the received call from the calling party that is previously known, retrieving, by the receiving party device, at least one picture character stored with the name of the calling party in the corresponding caller contact file, the at least one picture character graphically representing a receiving party sentiment corresponding to a previous interaction between the receiving party and the calling party; and
    displaying, on the receiving party device, the name of the calling party and the at least one picture character graphically representing the receiving party sentiment of the previous interaction between the receiving party and the calling part.

10. The computer system of claim 9, wherein retrieving the at least one picture character graphically representing the receiving party sentiment corresponding to the previous interaction between the receiving party associated with the receiving party device and the calling party associated with the calling party device further comprises:

based on a telephone number associated with the received call from the calling party device, retrieving the at least one picture character graphically representing the receiving party sentiment about the previous interaction with the calling party, wherein the previous interaction includes a previous call from the telephone number of the calling party.

11. The computer system of claim 9, wherein the previous interaction between the receiving party associated with the receiving party device and the calling party associated with the calling party device further comprises: a previous face-to-face conversation between the calling party and the receiving party.

12. The computer system of claim 9, wherein the previous interaction between the receiving party associated with the receiving party device and the calling party associated with the calling party device further comprises: a previous call between the calling party and the receiving party.

13. A computer program product for enhanced caller identification (ID), comprising:

one or more computer-readable storage media and program instructions collectively stored on the one or more computer-readable storage media, the program instructions executable by a processor to cause the processor to perform a method comprising:

receiving, by a receiving party device, a call from a calling party device, wherein the calling party device is associated with a calling party that is previously known to a receiving party associated with the receiving party device, and wherein a name of the calling party is previously stored in a corresponding caller contact file in a contact list associated with the receiving party device;

in response to the received call from the calling party that is previously known, retrieving, by the receiving party device, at least one picture character stored with the name of the calling party in the corresponding caller contact file, the at least one picture character graphically representing a receiving party sentiment corresponding to a previous interaction between the receiving party and the calling party; and displaying, on the receiving party device, the name of the calling party and the at least one picture character graphically representing the receiving party sentiment of the previous interaction between the receiving party and the calling part.

14. The computer program product of claim 13, wherein retrieving the at least one picture character graphically representing the receiving party sentiment corresponding to the previous interaction between the receiving party associated with the receiving party device and the calling party associated with the calling party device further comprises:

based on a telephone number associated with the received call from the calling party device, retrieving the at least one picture character graphically representing the receiving party sentiment about the previous interaction with the calling party, wherein the previous interaction includes a previous call from the telephone number of the calling party.

\* \* \* \* \*